United States Patent Office 3,669,697
Patented June 13, 1972

3,669,697
DELAY LINE GLASS
Cyril Francis Drake, Harlow, and Robert Walter James Amos, New Barnet, England, assignors to International Standard Electric Corporation, New York, N.Y.
No Drawing. Filed May 28, 1970, Ser. No. 41,570
Int. Cl. C03c 3/04, 3/10
U.S. Cl. 106—53                                   2 Claims

ABSTRACT OF THE DISCLOSURE

A silica/alkali-metal oxide glass composition for use in precision ultrasonic delay lines. By adding $Fe_2O_3$ as a significant constitutent, a relatively high alkali-metal oxide content can be used without degrading acoustic performance resulting in lower temperatures being necessary to produce a homogenous glass.

BACKGROUND OF THE INVENTION

This invention relates to a glass having a composition such that it has suitable properties for use as the delay medium in ultrasonic delay lines for color television, for computer stores, and for other applications requiring precision ultrasonic delay lines.

These suitable properties are a temperature coefficient of delay for the transmission of ultrasonic sound waves in the MHz. range which is essentially independent of temperature (<10 parts per million per ° C.) in the temperature range 0°–70° C., and an absolute value of delay which does not change with time.

It is known that glasses consisting of $K_2O$, PbO, $SiO_2$ with some minor additions of other metal oxides have suitable properties for use as an ultrasonic delay line medium. One of the difficulties in producing these known glasses is their low alkali-metal oxide content which results in very high temperatures (>1600° C.) being necessary to produce a homogenous glass from the raw materials.

SUMMARY OF THE INVENTION

It is an object of the present invention to provide a glass having a composition including $Fe_2O_3$ as a significant constituent together with silica and alkali-metal oxide.

More particularly the invention provides a glass having a composition comprising

|     | Mole percent |
| --- | --- |
| (a) $SiO_2$ | 62.25–75 |
| (b) PbO+BaO | 10–20 |
| With the BaO | 0–(20% of the PbO) |
| (c) $Fe_2O_3$ | 2.5–7.5 |
| (d) $M_2O$ | 2.5–7.5 | where $M_2O$ is any combination of alkali-metal oxides and at least three quarters of the total alkali-metal oxide is a single alkali-metal oxide.

DESCRIPTION OF THE PREFERRED EMBODIMENTS

By using $Fe_2O_3$ as one of the significant constituents of a silica/alkali-metal oxide glass, a relatively high alkali-metal oxide content can be used, without degrading the acoustic performance.

Moreover the presence of $Fe_2O_3$ makes it possible to reduce the PbO content without degrading the acoustic performance.

The constituents and their respective ranges of the glass of the present invention are selected from the following:

|     | Mole percent |
| --- | --- |
| $SiO_2$ | 62.25–75 |
| PbO+BaO 10–20 mole percent with BaO | 0–(20% of the PbO) |
| $Fe_2O_3$ | 2.5–7.5 |
| $M_2O$ | 2.5–7.5 |
| $Al_2O_3$ | |
| $Sb_2O_3$ | <5 |
| $Bi_2O_3$ | | where $M_2O$ is any combination of alkali-metal oxides and at least three quarters of the total alkali-metal oxide is a single alkali-metal oxide.

Any one, some or all of the $Al_2O_3$, $Sb_2O_3$ and $Bi_2O_3$ may be omitted, and replacement or partial replacement of one oxide by another of a type obviously similar to those skilled in the art art not to be excluded (for example the partial substitution, of up to about 20%, of PbO by BaO, e.g. substitution of 3 mole percent of PbO by 3 mole percent of BaO) as long as the $SiO_2$ and ($Fe_2O_3+M_2O$) are substantially in the ratio defined by the range given above.

As an example, a typical glass composition is as follows:

|     | Mole percent |
| --- | --- |
| $SiO_2$ | 69.10 |
| PbO | 17.25 |
| $K_2O$ | 6.80 |
| $Fe_2O_3$ | 6.85 |

The glass is manufactured by melting the mixed constituents in a refractory, e.g. alumina or fireclay, crucible in an oxidizing atmosphere, the melt temperature being of the order of 1500° C., casting or otherwise shaping from the melt into a suitable shape or shapes, and cooling from 600° C. to less than 50° C. at a substantially uniform rate over a period of not less than twelve hours.

An ultrasonic delay line having a delay medium comprising a block of glass having the composition as above and manufactured as described, had a temperature coefficient of delay for an acoustic signal of 5 MHz. through the length of the block of less than 3 parts per million per ° C. over a temperature range of 10°–70° C.

We claim:

1. A glass composition consisting essentially of:

|     | Mole percent |
| --- | --- |
| (a) $SiO_2$ | 0–(20% of the PbO) |
| (b) PbO+BaO | 62.25–75 |
| With the BaO | 10–20 |
| (c) $Fe_2O_3$ | 2.5–7.5 |
| (d) $Al_2O_3$ | 0–5 |
| (e) $Mi_2O_3$ | 0–5 |
| (f) $M_2O$ | 2.5–7.5 | where $M_2O$ is any combination of alkali-metal oxides and at least three quarters of the total alkali-metal oxide is a single alkali-metal oxide.

2. A glass composition, consisting essentially of:

|     | Mole percent |
| --- | --- |
| $SiO_2$ | 69.10 |
| PbO | 17.25 |
| $K_2O$ | 6.80 |
| $Fe_2O_3$ | 6.85 |

References Cited
UNITED STATES PATENTS

| 2,562,292 | 7/1951 | Black et al. | 106—53 |
| 3,326,702 | 6/1967 | Babcock | 106—53 |
| 3,517,345 | 6/1970 | Krause | 333—30 |

TOBIAS E. LEVOW, Primary Examiner

M. L. BELL, Assistant Examiner